United States Patent
Liu et al.

(10) Patent No.: US 9,417,066 B2
(45) Date of Patent: Aug. 16, 2016

(54) ELECTRONIC BIAS COMPENSATION FOR A GYROSCOPE

(75) Inventors: Yong Liu, San Morino, CA (US);
Anthony Dorian Challoner, Manhattan Beach, CA (US)

(73) Assignee: The Boeing Company, Chicago, IL (US)

( * ) Notice: Subject to any disclaimer, the term of this patent is extended or adjusted under 35 U.S.C. 154(b) by 914 days.

(21) Appl. No.: 13/348,263

(22) Filed: Jan. 11, 2012

(65) Prior Publication Data

US 2013/0179105 A1   Jul. 11, 2013

(51) Int. Cl.
*G01C 19/5776* (2012.01)

(52) U.S. Cl.
CPC .................. *G01C 19/5776* (2013.01)

(58) Field of Classification Search
CPC .................................................. G01C 19/5776
USPC ....................... 702/87; 73/861.356
See application file for complete search history.

(56) References Cited

U.S. PATENT DOCUMENTS

| | | | | |
|---|---|---|---|---|
| 3,355,954 | A * | 12/1967 | Levine et al. ................ | 74/5.34 |
| 5,218,867 | A * | 6/1993 | Varnham et al. ........... | 73/504.13 |
| 5,969,225 | A | 10/1999 | Kobayashi | |
| 7,040,163 | B2 | 5/2006 | Shcheglov et al. | |
| 7,100,444 | B2 | 9/2006 | Challoner | |
| 7,168,318 | B2 | 1/2007 | Challoner et al. | |
| 2004/0199347 | A1 | 10/2004 | Painter et al. | |
| 2006/0037417 | A1* | 2/2006 | Shcheglov et al. | G01C 19/5684 74/5.4 |
| 2007/0039386 | A1* | 2/2007 | Stewart et al. ............. | 73/504.14 |
| 2010/0218587 | A1* | 9/2010 | Stewart ........................ | 73/1.37 |
| 2011/0226056 | A1 | 9/2011 | Schroeder | |

OTHER PUBLICATIONS

D.D. Lynch, "Vibratory gyro analysis by the method of averaging", Delco System Operations, Delco Electronics Corp., Proceedings, 2nd St. Petersburg Conference on Gyroscopic Technology and Navigation, St. Petersburg, Russia, May 1995, pp. 26-24.*
Lui et al., "Electonic Bias Compensation for a Gyroscope," U.S. Appl. No. 13/780,265, filed Feb. 28, 2013, 67 pages.
"IEEE Standard Specification Format Guide and Test Procedure for Coriolois Vibratory Gyros," IEEE Aerospace and Electronic Systems Society, IEEE Std. 1431, Dec. 2004, 79 pp.
Hayworth, "Continuous Tuning and Calibration of Vibratory Gyroscopes," NASA Tech Briefs, NPO-30449, vol. 27, No. 10, 2 pp., Oct. 2003, 2 pp.
Trusov, "Overview of MEMS Gyroscopes: History, Principles of Operations, Types of Measurements," MicroSystems Laboratory, Mechanical and Aerospace Engineering, University of California at Irvine, May 2011, pp. 1-15.
Lynch, "Vibratory Gyro Analysis by the Method of Averaging," Delco Systems Operations, Delco Electronics Corp., Proceedings 2nd St. Petersburg Conference on Gyroscopic Technology and Navigation, St. Petersburg, Russia, May 1995, pp. 26-34.

(Continued)

*Primary Examiner* — Alexander Satanovsky
(74) *Attorney, Agent, or Firm* — Yee & Associates, P.C.

(57) ABSTRACT

A method for compensating for bias of a gyroscope. In one embodiment, bias measurements for a plurality of drive angles are generated using the gyroscope. A set of equations for the bias of the gyroscope is identified using a model for motion of the gyroscope. The set of equations includes a set of parameters for the bias of the gyroscope. A set of values for the set of parameters is identified using the bias measurements and the set of equations.

14 Claims, 7 Drawing Sheets

(56) References Cited

OTHER PUBLICATIONS

Office Action, dated Feb. 18, 2016, regarding U.S. Appl. No. 13/780,265, 35 pages.
Notice of Allowance, dated Apr. 15, 2016, regarding U.S. Appl. No. 13/780,265, 13 pages.
European Search Report, dated Jan. 1, 2016, regarding Application No. 13150472.2, 9 pages.
Friedland et al., "Theory and Error Analysis of Vibrating-Member Gyroscope," IEEE Transactions on Automatic control, Jan. 1, 1978, pp. 545-556.

* cited by examiner

_US 9,417,066 B2_

ELECTRONIC BIAS COMPENSATION FOR A GYROSCOPE

BACKGROUND INFORMATION

1. Field

The present disclosure relates generally to vibratory gyroscopes and, in particular, to a method and apparatus for electronically compensating for bias in vibratory gyroscopes.

2. Background

Gyroscopes are used for measuring and/or maintaining orientation. As used herein, a "gyroscope" is a sensor configured to detect and measure the angular motion of an object relative to an inertial frame of reference. Further, as used herein, an "inertial frame of reference" may be a coordinate system or set of axes that is non-accelerating. In other words, an inertial frame of reference is a frame of reference in which Newton's first law of motion is true. Newton's first law of motion states that the velocity of a body remains constant unless the body is acted upon by an external force.

A Coriolis vibratory gyroscope (CVG) is configured to be driven to vibrate along a first axis. Vibration along the first axis while the Coriolis vibratory gyroscope is being rotated about a fixed input axis generates a Coriolis force that induces vibrations along a second axis. These vibrations may be measured and used to determine an angular velocity for the rotation of the Coriolis vibratory gyroscope about the fixed input axis.

However, bias may contribute to the measurements of the vibrations. Bias may be the error in the measurements due to factors such as, for example, without limitation, temperature, part inconsistencies, and other suitable factors. Calibration of these gyroscopes during manufacturing of the gyroscopes may be less accurate than desired.

For example, calibration of these gyroscopes during manufacturing processes may use test data as compared to substantially real-time data. In particular, these calibration techniques may not take into account the effects of the temperature in the environment in which a gyroscope is being operated and/or inconsistencies that may develop over time from the time at which the gyroscope was manufactured. Further, some currently available systems for compensating for this bias may be unable to reduce the bias from these vibration measurements to within selected tolerances.

Therefore, it would be desirable to have a method and apparatus that takes into account one or more of the issues discussed above as well as possibly other issues.

SUMMARY

In one illustrative embodiment, a method for compensating for bias of a gyroscope is provided. Bias measurements for a plurality of drive angles are generated using the gyroscope. A set of equations for the bias of the gyroscope is identified using a model for motion of the gyroscope. The set of equations includes a set of parameters for the bias of the gyroscope. A set of values for the set of parameters is identified using the bias measurements and the set of equations.

In another illustrative embodiment, an apparatus comprises a compensation system. The compensation system is configured to receive bias measurements for a plurality of drive angles from a gyroscope. The compensation system is configured to identify a set of equations for the bias of the gyroscope using a model for motion of the gyroscope. The set of equations includes a set of parameters for the bias of the gyroscope. The compensation system is configured to identify a set of values for the set of parameters using the bias measurements and the set of equations.

In yet another illustrative embodiment, a method for electronically compensating for bias of a gyroscope is provided. Bias measurements for a plurality of drive angles are generated using the gyroscope. A set of equations for the bias of the gyroscope is identified using a model for motion of the gyroscope and an assumption that an inertial rate for the gyroscope is substantially zero. The set of equations includes a set of parameters for the bias of the gyroscope. A set of values for the set of parameters is identified using the bias measurements and the set of equations. The bias of the gyroscope at a selected drive angle is estimated using the set of equations with the set of values for the set of parameters to form an estimated bias. The estimated bias is subtracted from a measurement generated by the gyroscope for the selected drive angle to substantially compensate for the bias of the gyroscope.

The features, functions, and benefits can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of an illustrative embodiment of the present disclosure when read in conjunction with the accompanying drawings, wherein:

DETAILED DESCRIPTION

The different illustrative embodiments recognize and take into account different considerations. For example, the different illustrative embodiments recognize and take into account that some currently available methods for compensating for bias of a gyroscope may use a mechanical system to estimate the bias of the gyroscope. In some cases, this mechanical system may be used to operate the gyroscope and rotate the gyroscope at an angular velocity. Further, this type of mechanical system may introduce additional contributors to the bias of the gyroscope. Consequently, these types of systems may be unable to estimate the bias of the gyroscope within a desired level of accuracy.

Thus, the different illustrative embodiments provide a method and apparatus for electronically compensating for the bias of a gyroscope. In one illustrative embodiment, a method for compensating for bias of a gyroscope is provided. Bias measurements for a plurality of drive angles are generated using the gyroscope. A set of equations for the bias of the gyroscope is identified using a model for motion of the gyroscope. The set of equations includes a set of parameters for the bias of the gyroscope. A set of values for the set of parameters is identified using the bias measurements and the set of equations.

Figure 1:
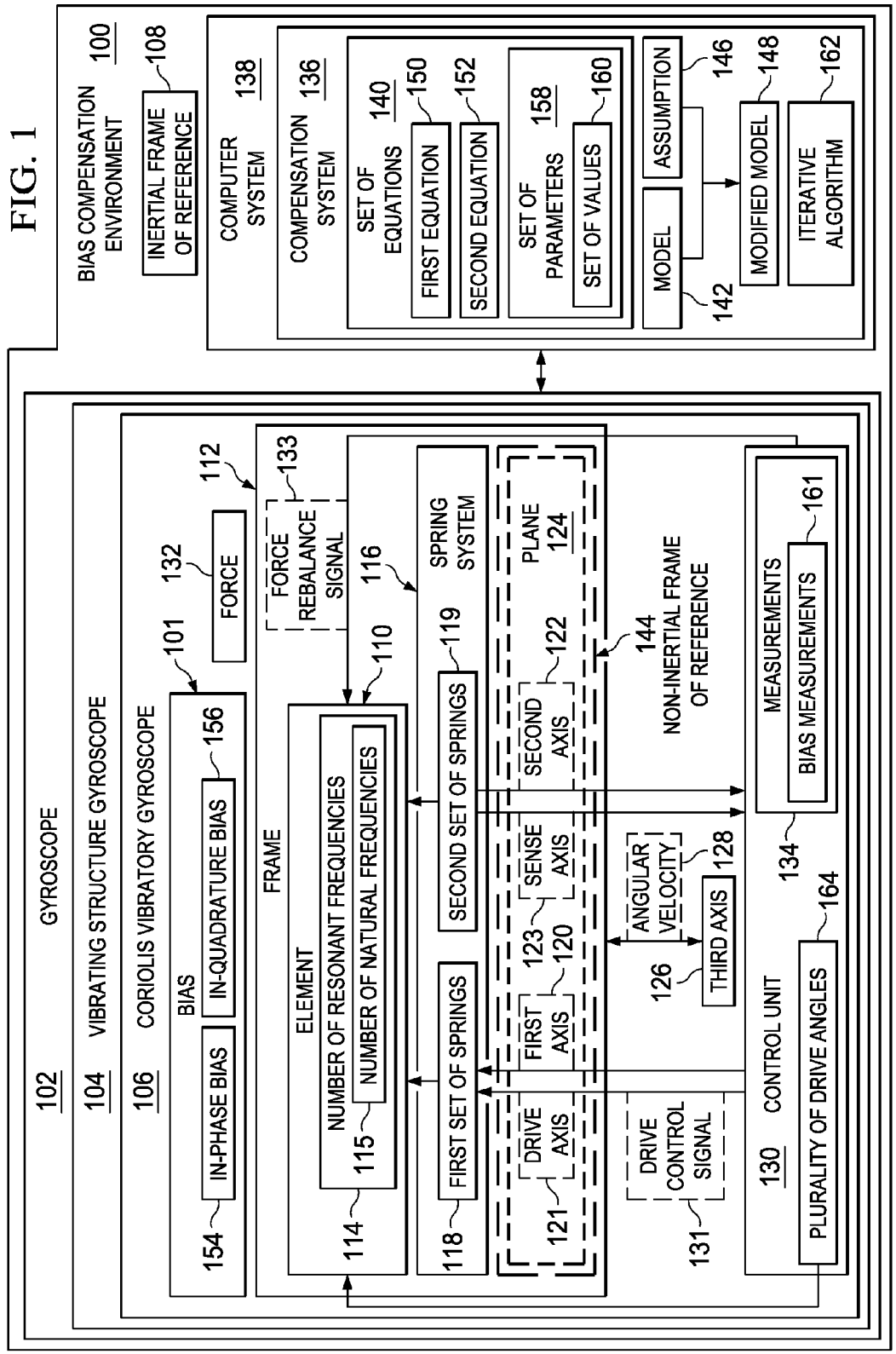
FIG. 1 is an illustration of a bias compensation environment in the form of a block diagram in accordance with an illustrative embodiment.

With reference now to FIG. 1, an illustration of a bias compensation environment in the form of a block diagram is depicted in accordance with an illustrative embodiment. In these illustrative examples, bias compensation environment 100 is an example of an environment in which the different illustrative embodiments may be implemented to compensate for bias 101 of gyroscope 102.

As depicted, gyroscope 102 takes the form of vibrating structure gyroscope (VSG) 104 in these examples. In particular, vibrating structure gyroscope 104 may be referred to as Coriolis vibratory gyroscope (CVG) 106. In these illustrative examples, gyroscope 102 is a sensor configured to measure angular motion relative to inertial frame of reference 108. Inertial frame of reference 108 is a coordinate system or set of axes that is non-accelerating.

In one illustrative example, gyroscope 102 comprises element 110 and frame 112. Element 110 may be a structure comprising a number of metallic alloys. Element 110 may be configured to vibrate, or resonate, at number of resonant frequencies 114 for element 110. In some cases, number of resonant frequencies 114 may be substantially equal to number of natural frequencies 115 for element 110. A natural frequency in number of natural frequencies 115 may be the frequency at which element 110 vibrates along a particular axis when a substantially continuous external force is not being applied to element 110. In this illustrative example, element 110 may be referred to as a "proof mass" or a resonator in some illustrative examples.

Element 110 may be associated with frame 112. The association between element 110 and frame 112 is a physical association in these depicted examples. A first component, such as element 110, may be considered to be associated with a second component, such as frame 112, by being secured to the second component, bonded to the second component, mounted to the second component, welded to the second component, fastened to the second component, and/or connected to the second component in some other suitable manner. The first component also may be connected to the second component using a third component. The first component also may be considered to be associated with the second component by being formed as part of and/or an extension of the second component.

For example, without limitation, element 110 may be associated with frame 112 through spring system 116. Spring system 116 may comprise first set of springs 118 and second set of springs 119. As used herein, a "set of" items means one or more items. For example, a set of springs means one or more springs.

As one specific example, first set of springs 118 may attach element 110 to frame 112 in a direction along first axis 120. In particular, first set of springs 118 allows element 110 to move linearly in a direction along first axis 120. Further, second set of springs 119 may attach element 110 to frame 112 in a direction along second axis 122. Second set of springs 119 allows element 110 to move linearly in a direction along second axis 122. In this manner, spring system 116 may constrain movement of element 110 to within plane 124 formed by first axis 120 and second axis 122. In other words, element 110 may have two degrees of freedom.

Frame 112, with element 110 attached to frame 112 through spring system 116 may, may be configured to move with respect to third axis 126. In particular, frame 112, with element 110 attached to frame 112, may rotate about third axis 126. Third axis 126 is a fixed axis that is substantially perpendicular to plane 124 formed by first axis 120 and second axis 122. In this manner, first axis 120, second axis 122, and third axis 126 are substantially orthogonal to each other. In some illustrative examples, first axis 120, second axis 122, and third axis 126 may be referred to as an x-axis, a y-axis, and a z-axis, respectively.

Frame 112 may rotate about third axis 126 with angular velocity 128. Angular velocity 128 also may be referred to as an inertial rate. In other words, angular velocity 128 for frame 112, with element 110 attached to frame 112, is the rate of rotation for frame 112 with respect to inertial frame of reference 108. Angular velocity 128 may be expressed in radians per second, revolutions per second, degrees per second, or in other suitable units.

In these illustrative examples, gyroscope 102 also includes control unit 130. Control unit 130 is configured to control operation of gyroscope 102. Control unit 130 may be implemented using at least one of a processor, a circuit, an integrated circuit (IC), a microchip, a microprocessor, a computer, and some other suitable type of controller. Further, gyroscope 102 may include a number of additional components, such as, for example, at least one of an electrode, a capacitor, and other suitable components.

As used herein, the phrase "at least one of", when used with a list of items, means that different combinations of one or more of the listed items may be used and only one of each item in the list may be needed. For example, "at least one of item A, item B, and item C" may include, without limitation, item A, or item A and item B. This example also may include item A, item B, and item C, or item B and item C. In other examples, "at least one of" may be, for example, without limitation, two of item A, one of item B, and ten of item C; four of item B and seven of item C; and other suitable combinations.

Control unit 130 controls gyroscope 102 such that element 110 moves linearly in a direction along drive axis 121 in plane 124. In these illustrative examples, this movement of element 110 is vibration of element 110 along drive axis 121. The angle of drive axis 121 with respect to first axis 120 may be referred to as a drive angle. Control unit 130 may control gyroscope 102 to operate at a selected drive angle such that the actual drive angle is within selected tolerances.

Drive axis 121 may be first axis 120 in some illustrative examples. For example, control unit 130 may drive element 110 to vibrate along first axis 120 at number of resonant frequencies 114 using drive control signal 131. In one illustrative example, drive control signal 131 may be sent to a number of electrodes attached to element 110 to cause element 110 to vibrate along first axis 120 at number of resonant frequencies 114.

In these illustrative examples, vibration of element 110 in the direction along first axis 120, while frame 112, with element 110 attached to frame 112, is rotating about third axis 126, generates force 132 in a direction along sense axis 123 in plane 124. In particular, force 132 is a Coriolis force in these examples. Force 132 acts at substantially right angles to angular velocity 128 for frame 112.

Sense axis 123 is an axis that is substantially orthogonal to drive axis 121. In other words, sense axis 123 is oriented at about 90 degrees with respect to drive axis 121. Sense axis 123 is the axis along which linear movement of element 110 is induced in response to force 132. For example, simultaneous vibration of element 110 in the direction along drive axis 121 and rotation of frame 112 about third axis 126 generates force 132, which induces vibration of element 110 in the direction along sense axis 123. Drive axis 121 and sense axis 123 are substantially orthogonal to third axis 126. When drive axis 121 is first axis 120, sense axis 123 may be second axis 122.

As depicted, control unit 130 uses force rebalance signal 133 to cause the amplitude of vibrations of element 110 along second axis 122 to be substantially zero. In other words, control unit 130 uses force rebalance signal 133 to substantially nullify the movement of element 110 along second axis 122 based on drive control signal 131. Control unit 130 generates measurements 134 of force rebalance signal 133. Measurements 134 may be used to determine angular velocity 128.

Measurements 134 may be less accurate than desired when bias 101 of gyroscope 102 contributes to measurements 134. Bias 101 is the error for gyroscope 102. For example, bias 101 is the difference between measurements 134 and the measurements that should actually be generated. Bias 101 may be the contribution to measurements 134 when angular velocity 128 is substantially zero. In this manner, bias 101 may be referred to as a zero-rate bias.

Bias 101 may be caused by a number of different factors. These factors may include, for example, without limitation, temperature, inconsistencies in the fabrication of the different components for gyroscope 102, characteristics of element 110, characteristics of a sensing system in gyroscope 102, characteristics of control unit 130, and other suitable factors. These factors also may include damping and stiffness asymmetry between first axis 120 and second axis 122, asymmetry between drive axis 121 and sense axis 123 alignment, and/or other suitable types of asymmetry.

Compensation system 136 may be used to electronically compensate for bias 101. Compensation system 136 may be implemented using hardware, software, or a combination of the two. For example, compensation system 136 may be implemented within computer system 138. Computer system 138 may comprise a number of computers. When computer system 138 comprises more than one computer, these computers may be in communication with each other.

Compensation system 136 identifies set of equations 140 for bias 101 of gyroscope 102 using model 142 for the motion of gyroscope 102 with respect to non-inertial frame of reference 144 and assumption 146. Non-inertial frame of reference 144 is a rotating frame of reference. In this illustrative example, non-inertial frame of reference 144 may be formed by first axis 120 and second axis 122. In other words, plane 124 formed by first axis 120 and second axis 122 may rotate with respect to inertial frame of reference 108.

Model 142 may be a model for the motion of gyroscope 102 along first axis 120 and second axis 122. In this illustrative example, model 142 takes the form of a number of equations that describe the motion of gyroscope 102 with respect to first axis 120 and second axis 122.

Assumption 146 is an assumption that angular velocity 128 for gyroscope 102 is substantially zero within selected tolerances. In other words, assumption 146 assumes that frame 112 is not rotating about third axis 126 and has a substantially zero inertial rate. Compensation system 136 modifies model 142 based on assumption 146 to form modified model 148. In particular, modified model 148 is simplified as compared to model 142.

Compensation system 136 identifies set of equations 140 using modified model 148. Set of equations 140 may include first equation 150 and second equation 152. First equation 150 is for the portion of bias 101 that is in-phase bias 154. In-phase bias 154 may be the portion of bias 101 that is substantially in-phase with the linear velocity of the vibrations of gyroscope 102. Second equation 152 is for the portion of bias 101 that is in-quadrature bias 156. In-quadrature bias 156 may be the portion of bias 101 that is substantially in-quadrature with the linear velocity of the vibrations of gyroscope 102. In-quadrature bias 156 also may be referred to as quadrature bias.

As depicted, set of equations 140 includes set of parameters 158. Set of parameters 158 includes one or more parameters that contribute to bias 101. These parameters may include, for example, at least one of a drive axis misalignment angle, a sense axis misalignment angle, a damping azimuth angle, a damping asymmetry term, a difference between the natural frequencies of drive axis 121 and sense axis 123, an azimuth angle of drive axis 121 with respect to first axis 120, and some other suitable parameters. Values for these parameters may be unknown.

Compensation system 136 identifies set of values 160 for set of parameters 158 using set of equations 140, bias measurements 161, and iterative algorithm 162. Compensation system 136 identifies set of values 160 for set of parameters 158 within selected tolerances. In other words, compensation system 136 uses set of equations 140, bias measurements 161, and iterative algorithm 162 to estimate set of values 160 for set of parameters 158.

Bias measurements 161 may be measurements generated by control unit 130 at plurality of drive angles 164. A drive angle in plurality of drive angles 164 is the angle of drive axis 121 with respect to first axis 120 along which control unit 130 drives element 110 to move linearly. For example, the drive angle may be selected from a range between about 0 degrees and about 360 degrees with respect to first axis 120. In one illustrative example, plurality of drive angles 164 may include about 0 degrees, about 45 degrees, and about 90 degrees with respect to first axis 120.

Iterative algorithm 162 may be, for example, without limitation, a least-squares algorithm. Iterative algorithm 162 may be used to solve at least one value in set of values 160 using set of equations 140 and bias measurements 161.

Set of values 160 may be used to identify a particular drive angle at which in-quadrature bias 156 is substantially zero. In other words, set of values 160 may be used to identify the drive angle that substantially zeros out in-quadrature bias 156 within selected tolerances. Gyroscope 102 may be operated at this particular drive angle to calibrate the output of gyroscope 102 using set of equations 140.

Further, with set of values 160 for set of parameters 158, compensation system 136 may estimate bias 101 of gyroscope 102 at a selected drive angle using set of equations 140 to form an estimated bias. Compensation system 136 may subtract the estimated bias from measurements generated by gyroscope 102 for the selected drive angle to electronically compensate for bias 101 of gyroscope 102.

The illustration of bias compensation environment in FIG. 1 is not meant to imply physical or architectural limitations to the manner in which an illustrative embodiment may be implemented. Other components in addition to and/or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in some illustrative examples, gyroscope 102 may have elements in addition to and/or in place of element 110. Further, in some case, element 110 may be attached to a case, a housing, a number of structures, or some other suitable type of structure in addition to and/or in place of frame 112.

Figure 2:
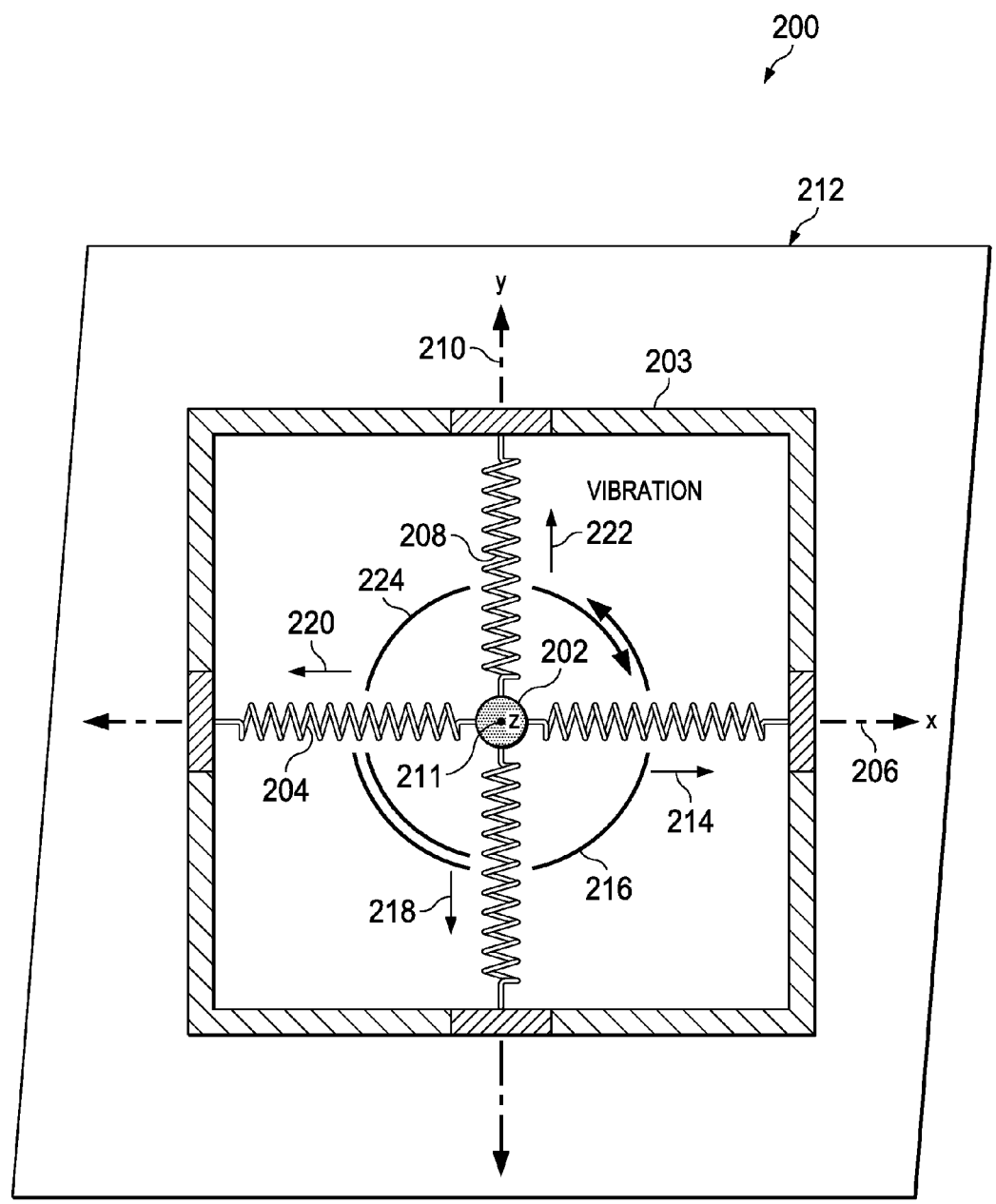
FIG. 2 is an illustration of a functional model for a gyroscope in accordance with an illustrative embodiment.

With reference now to FIG. 2, an illustration of a functional model for a gyroscope is depicted in accordance with an illustrative embodiment. Model 200 is an example of a function model for a gyroscope, such as, for example, gyroscope 102 in FIG. 1. In this illustrative example, model 200 includes element 202 and frame 203. Of course, in other illustrative examples, model 200 may include other components for the gyroscope in addition to the ones described in FIG. 2.

Element 202 is associated with frame 203 by first set of springs 204 along the direction of x-axis 206. Element 202 is associated with frame 203 by second set of springs 208 along the direction of y-axis 210. In this illustrative example, x-axis 206 and y-axis 210 are examples of implementations for first axis 120 and second axis 122, respectively, in FIG. 1.

As depicted, x-axis 206 and y-axis 210 form plane 212. Element 202 may vibrate along x-axis 206 at a first natural frequency. Further, element 202 may vibrate along y-axis at a second natural frequency. The first natural frequency may be the same or different from the second natural frequency, depending on the implementation. Vibration of element 202 along x-axis 206 may be a first mode, while vibration of element 202 along y-axis 210 may be a second mode. The first mode and the second mode may be referred to as, for example, a drive mode and a sense mode, respectively.

Element 202 may vibrate along x-axis 206 and/or y-axis 210 independently of movement of frame 203 in this illustrative example. In particular, first set of springs 204 and second set of springs 208 may allow element 202 to move along x-axis 206 and y-axis 210 independently of the movement of frame 203.

Motion of element 202 is constrained to within plane 212 in this illustrative example. In one illustrative example, a control unit, such as control unit 130 in FIG. 1, may drive element 202 to vibrate along the direction of x-axis 206. Frame 203 may be rotated about a z-axis 211 that is substantially perpendicular to plane 212. Rotation of frame 203 about z-axis 211 while element 202 is moved along the direction of x-axis 206 generates a Coriolis force that causes element 202 to vibrate along the direction of y-axis 210.

For example, if element 202 is moved in the direction of arrow 214 along x-axis 206 while frame 203 is rotated about z-axis 211 in the direction of arrow 216, element 202 may be moved in the direction of arrow 218 along y-axis 210. If element 202 is moved in the direction of arrow 220 along x-axis 206 while frame 203 is rotated about z-axis 211 in the direction of arrow 216, element 202 may be moved in the direction of arrow 222 along y-axis 210.

Similarly, if element 202 is moved in the direction of arrow 214 along x-axis 206 while frame 203 is rotated about z-axis 211 in the direction of arrow 224, element 202 may be moved in the direction of arrow 222 along y-axis 210. If element 202 is moved in the direction of arrow 220 along x-axis 206 while frame 203 is rotated about z-axis 211 in the direction of arrow 224, element 202 may be moved in the direction of arrow 218 along y-axis 210.

Figure 3:
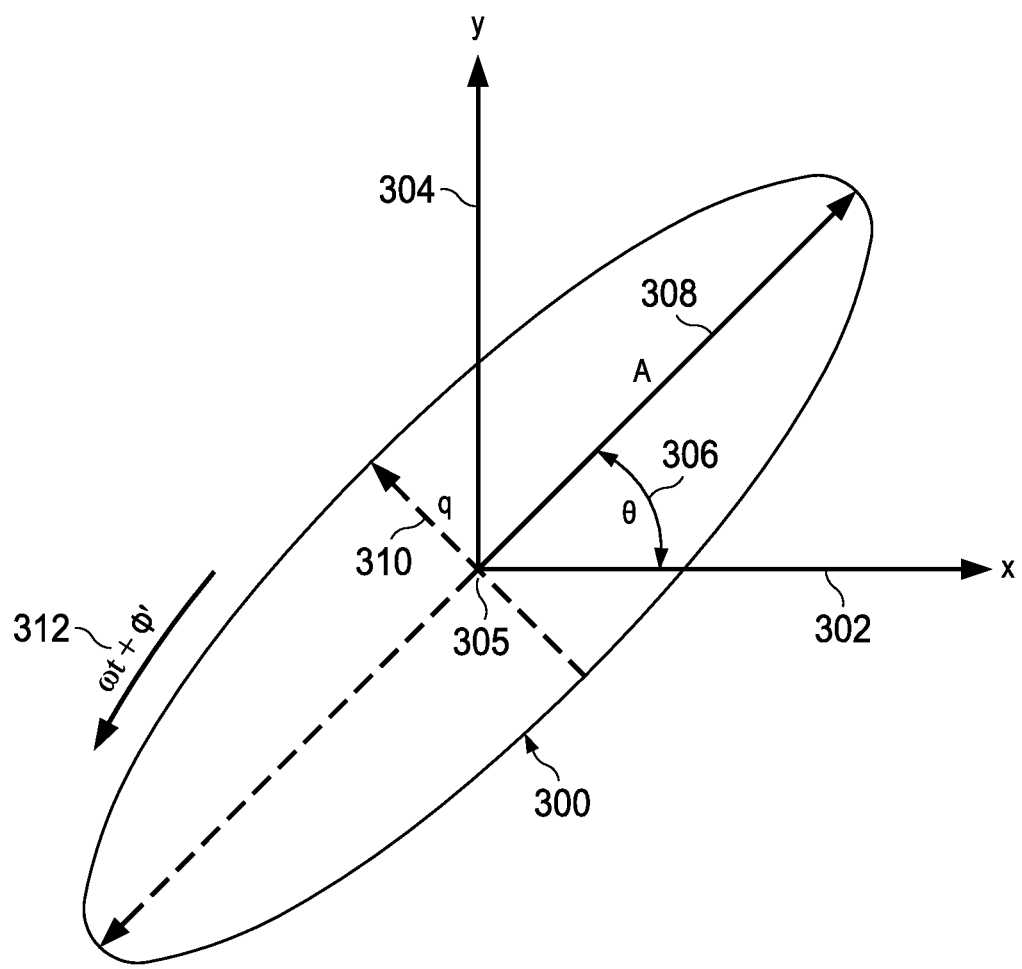
FIG. 3 is an illustration of the orbit of an element for a gyroscope in accordance with an illustrative embodiment.

With reference now to FIG. 3, an illustration of the orbit of an element for a gyroscope is depicted in accordance with an illustrative embodiment. In this illustrative example, orbit 300 of an element, such as element 202 from FIG. 2, is depicted with respect to x-axis 302 and y-axis 304. X-axis 302 is the same as x-axis 206 in FIG. 2. Y-axis is the same as y-axis 210 in FIG. 2.

Element 202 may oscillate about origin 305 at the intersection of x-axis 302 and y-axis 304. Oscillation of element 202 may follow a pendulum-type behavior. In this manner, orbit 300 may be a pendulum orbit in this illustrative example.

Parameters for orbit 300 include pendulum angle 306, principal amplitude 308, quadrature amplitude 310, and phase 312. As depicted, pendulum angle 306, $\theta$, is an angle with respect to x-axis 302 and defines an axis relative to x-axis 302 along which element 202 may vibrate. Principal amplitude 308, A, is the amplitude of vibrations for element 202 along the axis defined by pendulum angle 306.

Quadrature amplitude 310, q, is the amplitude of vibrations for element 202 along the axis in-quadrature to the axis defined by pendulum angle 306. In other words, quadrature amplitude 310 is the amplitude of vibrations for element 202 along the axis substantially orthogonal to the axis defined by pendulum angle 306. Further, phase 312, $\phi'$, is the phase for orbit 300.

A control unit, such as control unit 130 in FIG. 1, may be configured to control external force components applied to element 202 and/or frame 203 in FIG. 2 to control pendulum angle 306, principal amplitude 308, quadrature amplitude 310, and phase 312. For example, the control unit may control forces exerted on element 202 such that these forces have a same phase as the phase of the natural frequency for element 202.

Further, the control unit may control forces exerted on element 202 such that principal amplitude 308, A, remains substantially constant during operation of the gyroscope against any damping forces. The rate at which principal amplitude 308, A, decreases because of damping is proportional to A/$\tau$, in which $\tau$ is a damping time constant. Additionally, the control unit may control the forces exerted on element 202 such that pendulum angle 306 and quadrature amplitude 310 remain substantially zero with selected tolerances during operation of the gyroscope.

Figure 4:
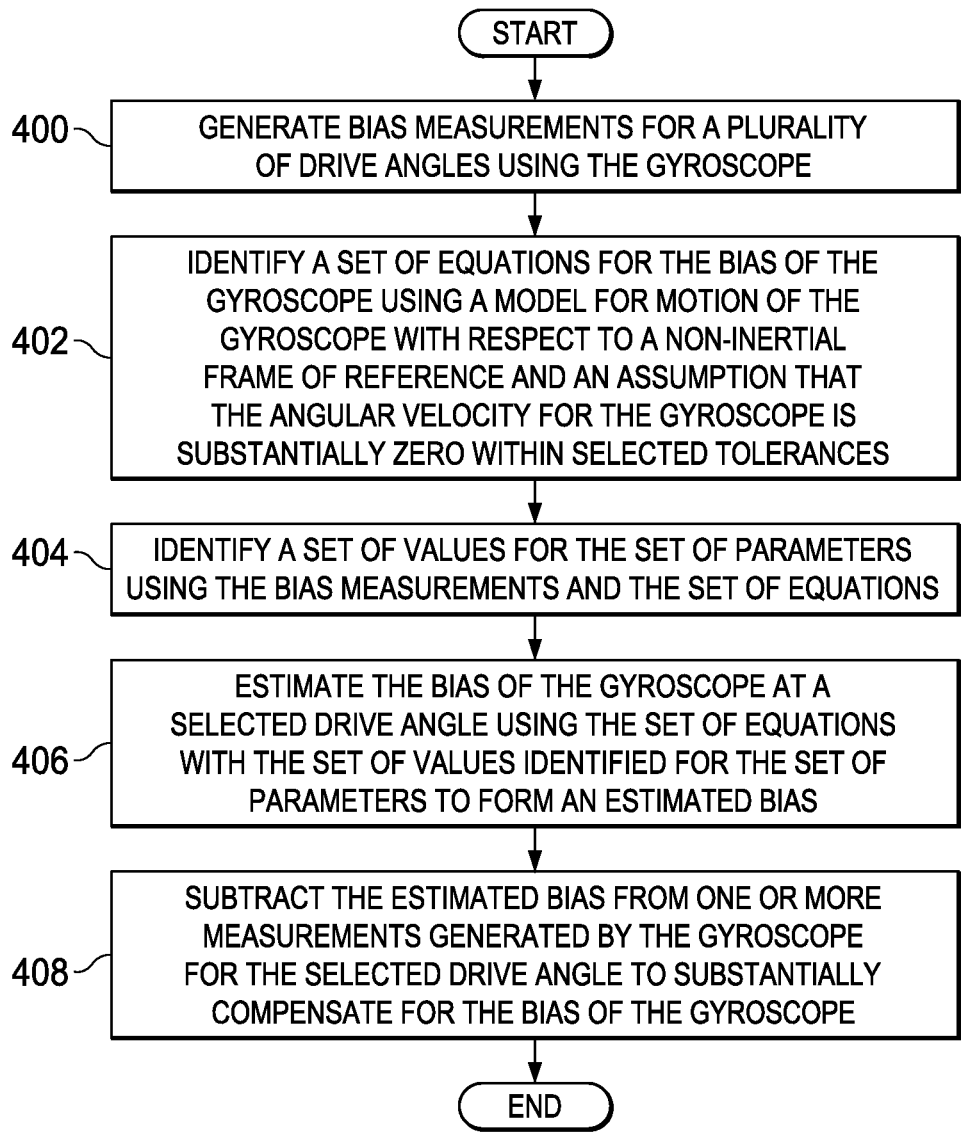
FIG. 4 is an illustration of a process for compensating for bias of a gyroscope in the form of a flowchart in accordance with an illustrative embodiment.

With reference now to FIG. 4, an illustration of a process for compensating for bias of a gyroscope in the form of a flowchart is depicted in accordance with an illustrative embodiment. The process illustrated in FIG. 4 may be implemented using compensation system 136 to compensate for bias 101 of gyroscope 102 in FIG. 1.

The process begins by generating bias measurements for a plurality of drive angles using the gyroscope (operation 400). In operation 400, the bias measurements are generated with the angular velocity for the gyroscope substantially equal to zero within selected tolerances.

The process then identifies a set of equations for the bias of the gyroscope using a model for motion of the gyroscope with respect to a non-inertial frame of reference and an assumption that the angular velocity for the gyroscope is substantially zero within selected tolerances (operation 402). The angular velocity for the gyroscope is with respect to an inertial frame of reference. The set of equations includes a set of parameters. The one or more parameters in the set of parameters have unknown values. In this illustrative example, in operation 402, the set of equations includes a first equation for in-phase bias of the gyroscope and a second equation for in-quadrature bias of the gyroscope.

Thereafter, the process identifies a set of values for the set of parameters using the bias measurements and the set of equations (operation 404). Operation 404 may be performed using an iterative algorithm, such as, for example, without limitation, a least-squares algorithm.

Next, the process estimates the bias of the gyroscope at a selected drive angle using the set of equations with the set of values identified for the set of parameters to form an estimated bias (operation 406). The selected drive angle may be, for example, the current drive angle at which the gyroscope is being operated. In this manner, the bias of the gyroscope may be estimated in substantially real-time during operation of the gyroscope.

The process then subtracts the estimated bias from one or more measurements generated by the gyroscope for the selected drive angle to substantially compensate for the bias of the gyroscope (operation 408), with the process terminating thereafter. In operation 408, the estimated bias is subtracted from a measurement to substantially remove the contribution of the bias of the gyroscope from the measurement within selected tolerances. In this manner, the bias of the gyroscope may be electronically compensated in substantially real-time.

Figure 5:
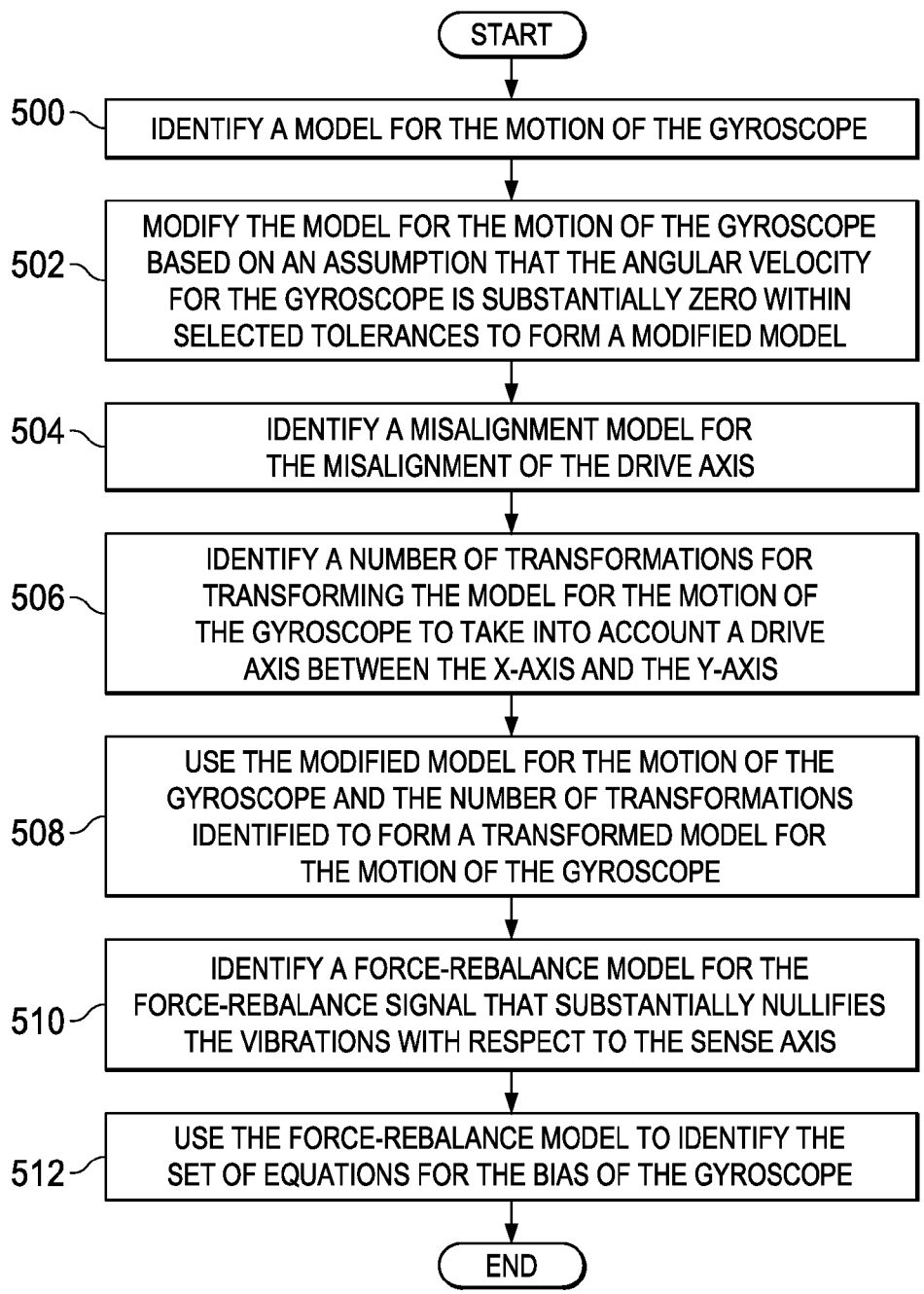
FIG. 5 is an illustration of a process for identifying a set of equations for the bias of a gyroscope in the form of a flowchart in accordance with an illustrative embodiment.

With reference now to FIG. 5, an illustration of a process for identifying a set of equations for the bias of a gyroscope in the form of a flowchart is depicted in accordance with an illustrative embodiment. The process illustrated in FIG. 5 may be an example of one process that may be used to implement operation 402 in FIG. 4.

The process begins by identifying a model for the motion of the gyroscope (operation 500). The gyroscope comprises an element associated with a frame. In this illustrative example, the model comprises the following equations:

$$\begin{cases} \ddot{x} - k(2\Omega\dot{y} + \dot{\Omega}y) + \frac{2}{\tau}\dot{x} + \Delta\left(\frac{1}{\tau}\right)(\dot{y}\sin 2\theta_\tau + \dot{x}\cos 2\theta_\tau) + (\omega^2 - k'\Omega^2)x - \\ \quad \omega\Delta\omega(x\cos 2\theta_\omega + y\sin 2\theta_\omega) = f_x + \gamma_x g_x \\ \ddot{y} + k(2\Omega\dot{x} + \dot{\Omega}x) + \frac{2}{\tau}\dot{y} - \Delta\left(\frac{1}{\tau}\right)(\dot{y}\cos 2\theta_\tau - \dot{x}\sin 2\theta_\tau) + (\omega^2 - k'\Omega^2)y + \\ \quad \omega\Delta\omega(y\cos 2\theta_\omega - x\sin 2\theta_\omega) = f_y + \gamma_y g_y \end{cases} \quad (1)$$

where $$\omega = \sqrt{\frac{K}{m}}, \quad (2)$$

$$\omega^2 = \frac{\omega_1^2 + \omega_2^2}{2},$$

and $$\omega\Delta\omega = \frac{\omega_1^2 - \omega_2^2}{2},$$

where $$\frac{1}{\tau} = \frac{1}{2}\left(\frac{1}{\tau_1} + \frac{1}{\tau_2}\right) \quad (3)$$

and $$\Delta\left(\frac{1}{\tau}\right) = \left(\frac{1}{\tau_1} - \frac{1}{\tau_2}\right),$$

and where x is a position of the element in the gyroscope with respect to an x-axis, $\dot{x}$ is the first derivative of x with respect to time, $\ddot{x}$ is the second derivative of x with respect to time, y is a position of the element in the gyroscope with respect to a y-axis, $\dot{y}$ is the first derivative of y with respect to time, $\ddot{y}$ is the second derivative of y with respect to time, $\Omega$ is the angular velocity of the gyroscope with respect to an inertial frame of reference, k is a gain, $\tau$ is a damping time constant, 1 indicates a drive axis for the element, 2 indicates a sense axis for the element, $\tau_1$ is the damping time constant with respect to the drive axis, $\tau_2$ is the damping time constant with respect to the sense axis, $\omega$ is the natural frequency of the element in the gyroscope, $\omega_1$ is the natural frequency for the drive axis, $\omega_2$ is the natural frequency for the sense axis, $\Delta$ indicates a difference, $\theta_\tau$ is the azimuth of the $\tau_1$ damping axis with respect to the x-axis and also may be referred to as the damping azimuth angle, k' is a gain, $\theta_\omega$ is the azimuth of the drive axis with respect to the x-axis, $f_x$ is an external force component exerted on the element along the x-axis, $f_y$ is an external force component exerted on the element along the y-axis for a force-rebalance signal, $\gamma_x$ is a gain with respect to the x-axis, $\gamma_y$ is a gain with respect to the y-axis, $g_x$ is a linear acceleration component for the frame with respect to the x-axis, $g_y$ is a linear acceleration component for the frame with respect to the y-axis, K is the spring constant for the spring connecting the element to the frame of the gyroscope along the x-axis, and m is the mass of the element in the gyroscope. The term, $$\Delta\left(\frac{1}{\tau}\right),$$

may be referred to as a damping asymmetry term.

The process then modifies the model for the motion of the gyroscope based on an assumption that the angular velocity for the gyroscope is substantially zero within selected tolerances to form a modified model (operation 502). In operation 502, an assumption is also made that the contribution of the linear acceleration components for the frame are negligible. The modified model comprises the following equations:

$$\begin{cases} \ddot{x} + \frac{2}{\tau}\dot{x} + \Delta\left(\frac{1}{\tau}\right)(\dot{y}\sin 2\theta_\tau + \dot{x}\cos 2\theta_\tau) + \omega^2 x - \omega\Delta\omega(x\cos 2\theta_\omega + \\ \quad y\sin 2\theta_\omega) = f_x \\ \ddot{y} + \frac{2}{\tau}\dot{y} - \Delta\left(\frac{1}{\tau}\right)(\dot{y}\cos 2\theta_\tau - \dot{x}\sin 2\theta_\tau) + \omega^2 y + \omega\Delta\omega(y\cos 2\theta_\omega - \\ \quad x\sin 2\theta_\omega) = f_y \end{cases} \quad (4)$$

Thereafter, the process identifies a misalignment model for the misalignment of the drive axis (operation 504). The misalignment of the drive axis occurs when the axis along which the element of the gyroscope is driven to vibrate is different from the drive axis indicated by the drive control signal generated by the control unit for the gyroscope.

In other words, the control unit may generate a drive control signal to control the element to move along the drive axis. However, the actual movement of the element may be along an axis offset from the drive axis by angle a. This angle, a, may be referred to as a drive axis misalignment angle. Further, with this type of misalignment, the axis along which the element is induced to vibrate in response to a Coriolis force may be offset from the sense axis by angle b. This angle, b, may be referred to as a sense axis misalignment angle. In this illustrative example, these angles, a and b, may be in radians (rads).

The misalignment model may be defined by the following equations:

$$\begin{bmatrix} f_{x,actual} \\ f_{y,actual} \end{bmatrix} = \underbrace{\begin{bmatrix} 1 & a \\ b & 1 \end{bmatrix}}_{E(a,b)} \begin{bmatrix} f_x \\ f_y \end{bmatrix} = E(a,b) \begin{bmatrix} f_x \\ f_y \end{bmatrix}, \quad (5)$$

where $f_{x,actual}$ is the actual force exerted along the x-axis and $f_{y,actual}$ is the actual force exerted along the y-axis.

The process then identifies a number of transformations for transforming the model for the motion of the gyroscope to take into account a drive axis between the x-axis and the y-axis (operation 506). For example, the gyroscope may be driven to vibrate along an axis between the x-axis and the y-axis. The angle between this drive axis and the x-axis is the drive angle. The drive axis and the sense axis that is substantially orthogonal to the drive axis form a rotated frame of reference with respect to the frame of reference formed by the x-axis and the y-axis.

A first transformation is defined as follows:

$$\begin{bmatrix} x_s \\ y_s \end{bmatrix} = \begin{bmatrix} \cos\varphi & \sin\varphi \\ -\sin\varphi & \cos\varphi \end{bmatrix} \begin{bmatrix} x \\ y \end{bmatrix}, \quad (6)$$

where $\phi$ is the drive angle, $x_s$ is the position of the element with respect to the drive axis, $y_s$ is the position of the element with respect to the sense axis, cos is the cosine function, and sin is the sine function.

A second transformation needed for deriving the model for the motion of the gyroscope with respect to the rotated frame of reference is defined as follows:

$$\begin{bmatrix} x \\ y \end{bmatrix} = \begin{bmatrix} \cos\varphi & -\sin\varphi \\ \sin\varphi & \cos\varphi \end{bmatrix} \begin{bmatrix} x_s \\ y_s \end{bmatrix} = M(\varphi) \begin{bmatrix} x_s \\ y_s \end{bmatrix}. \quad (7)$$

Further, $$\begin{bmatrix} \dot{x} \\ \dot{y} \end{bmatrix} = \frac{dM(\varphi)}{dt} \begin{bmatrix} x_s \\ y_s \end{bmatrix} + M(\varphi) \begin{bmatrix} \dot{x}_s \\ \dot{y}_s \end{bmatrix}, \quad (8)$$

$$\begin{bmatrix} \ddot{x} \\ \ddot{y} \end{bmatrix} = \frac{d^2 M(\varphi)}{dt^2} \begin{bmatrix} x_s \\ y_s \end{bmatrix} + 2\frac{dM(\varphi)}{dt} \begin{bmatrix} \dot{x}_s \\ \dot{y}_s \end{bmatrix} + M(\varphi) \begin{bmatrix} \ddot{x}_s \\ \ddot{y}_s \end{bmatrix}, \text{ and} \quad (9)$$

$$\begin{bmatrix} f_{x,actual} \\ f_{y,actual} \end{bmatrix} = \underbrace{\begin{bmatrix} 1 & a \\ b & 1 \end{bmatrix}}_{E(a,b)} M(\varphi) \begin{bmatrix} f_{x_s} \\ f_{y_s} \end{bmatrix} = EM(\varphi) \begin{bmatrix} f_{x_s} \\ f_{y_s} \end{bmatrix}, \quad (10)$$

where $\dot{x}_s$ is the first derivative of $x_s$ with respect to time, $\ddot{x}_s$ is the second derivative of $x_s$ with respect to time, $\dot{y}_s$ is the first derivative of $y_s$ with respect to time, $\ddot{y}_s$ is the second derivative of $y_s$ with respect to time, $f_{x_s}$ is the external force component exerted on the element in the direction of the drive axis through $x_s$, and $f_{y_s}$ is the external force component exerted on the element in the direction of the sense axis through $y_s$.

The process uses the modified model for the motion of the gyroscope and the number of transformations identified to form a transformed model for the motion of the gyroscope (operation 508). In operation 508, an assumption is made that the angular velocity for the gyroscope is at a lower rate than the rate at which the vibrations of the sense axis are being measured.

Consequently, the first and second derivatives in equations (8) and (9) may be negligible. Equations (8) and (9) may be simplified as follows:

$$\begin{bmatrix} \dot{x} \\ \dot{y} \end{bmatrix} = M(\varphi) \begin{bmatrix} \dot{x}_s \\ \dot{y}_s \end{bmatrix} \quad (11)$$

$$\begin{bmatrix} \ddot{x} \\ \ddot{y} \end{bmatrix} = M(\varphi) \begin{bmatrix} \ddot{x}_s \\ \ddot{y}_s \end{bmatrix}. \quad (12)$$

The transformed model may be defined as follows:

$$\begin{bmatrix} \ddot{x}_s \\ \ddot{y}_s \end{bmatrix} + \underbrace{\begin{bmatrix} \frac{2}{\tau} + \Delta\left(\frac{1}{\tau}\right)\cos 2\theta_\tau & \Delta\left(\frac{1}{\tau}\right)\sin 2\theta_\tau \\ \Delta\left(\frac{1}{\tau}\right)\sin 2\theta_\tau & \frac{2}{\tau} - \Delta\left(\frac{1}{\tau}\right)\cos 2\theta_\tau \end{bmatrix}}_{D(\tau,\Delta(\frac{1}{\tau}),\theta_\tau)} \begin{bmatrix} \dot{x} \\ \dot{y} \end{bmatrix} + \quad (13)$$

$$\underbrace{\begin{bmatrix} \omega^2 - \omega\Delta\omega\cos 2\theta_\omega & -\omega\Delta\omega\sin 2\theta_\omega \\ -\omega\Delta\omega\sin 2\theta_\omega & \omega^2 + \omega\Delta\omega\cos 2\theta_\omega \end{bmatrix}}_{S(\omega,\Delta\omega,\theta_\omega)} \begin{bmatrix} x \\ y \end{bmatrix} = E(a,b)M(\varphi) \begin{bmatrix} f_{x_s} \\ f_{y_s} \end{bmatrix}$$

with the transformed model being rewritten as follows:

$$\begin{bmatrix} \ddot{x}_s \\ \ddot{y}_s \end{bmatrix} + \begin{bmatrix} \omega_x^2 & 0 \\ 0 & 0 \end{bmatrix} \begin{bmatrix} x_s \\ y_s \end{bmatrix} + \underbrace{M^{-1}(\varphi)DM(\varphi)}_{H} \begin{bmatrix} \dot{x}_s \\ \dot{y}_s \end{bmatrix} + \quad (14)$$

$$\underbrace{\left(M^{-1}(\varphi)SM(\varphi) - \begin{bmatrix} \omega_x^2 & 0 \\ 0 & 0 \end{bmatrix}\right)}_{G} \begin{bmatrix} x_s \\ y_s \end{bmatrix} = \underbrace{M^{-1}(\varphi)E(a,b)M(\varphi)}_{K} \begin{bmatrix} f_{x_s} \\ f_{y_s} \end{bmatrix}$$

The new matrices may be defined as follows:

$$\begin{cases} H = M^{-1}(\varphi)DM(\varphi) = \begin{bmatrix} h_{11} & h_{12} \\ h_{21} & h_{22} \end{bmatrix} \\ G = M^{-1}(\varphi)SM(\varphi) - \begin{bmatrix} \omega_x^2 & 0 \\ 0 & 0 \end{bmatrix} = \begin{bmatrix} g_{11} & g_{12} \\ g_{21} & g_{22} \end{bmatrix} \\ K = M^{-1}(\varphi)E(a,b)M(\varphi) = \begin{bmatrix} k_{11} & k_{12} \\ k_{21} & k_{22} \end{bmatrix} \end{cases} \quad (15)$$

and the transformed model for the motion of the gyroscope further simplified as follows:

$$\begin{bmatrix} \ddot{x}_s \\ \ddot{y}_s \end{bmatrix} + \begin{bmatrix} \omega_x^2 & 0 \\ 0 & 0 \end{bmatrix} \begin{bmatrix} x_s \\ y_s \end{bmatrix} + \begin{bmatrix} h_{11}\dot{x}_s + h_{12}\dot{y}_s \\ h_{21}\dot{x}_s + h_{22}\dot{y}_s \end{bmatrix} + \begin{bmatrix} g_{11}x_s + g_{12}y_s \\ g_{21}x_s + g_{22}y_s \end{bmatrix} = K \begin{bmatrix} f_{x_s} \\ f_{y_s} \end{bmatrix} \quad (16)$$

Thereafter, the process identifies a force-rebalance model for the force-rebalance signal that substantially nullifies the vibrations with respect to the sense axis (operation 510). For example, when the vibrations with respect to the sense axis are substantially nullified, $$\begin{cases} \ddot{y}_s = 0 \\ \dot{y}_s = 0 \\ y_s = 0, \end{cases} \quad (17)$$

and $$\begin{bmatrix} \ddot{x}_s \\ \ddot{y}_s \end{bmatrix} + \begin{bmatrix} \omega_x^2 & 0 \\ 0 & 0 \end{bmatrix} \begin{bmatrix} x_s \\ y_s \end{bmatrix} = \begin{bmatrix} 0 \\ 0 \end{bmatrix}. \quad (18)$$

Consequently, the force-rebalance signal may be solved for using the following equation:

$$\begin{bmatrix} h_{11}\dot{x}_s \\ h_{21}\dot{x}_s \end{bmatrix} + \begin{bmatrix} g_{11}x_s \\ g_{21}x_s \end{bmatrix} = K \begin{bmatrix} f_{x_s} \\ f_{y_s} \end{bmatrix}, \quad (19)$$

which may be simplified to $$\begin{bmatrix} h_{11}\dot{x}_s + g_{11}x_s \\ h_{21}\dot{x}_s + g_{21}x_s \end{bmatrix} = \begin{bmatrix} g_{11} & h_{11} \\ g_{21} & h_{21} \end{bmatrix} \begin{bmatrix} x_s \\ \dot{x}_s \end{bmatrix} = K \begin{bmatrix} f_{x_s} \\ f_{y_s} \end{bmatrix}. \quad (20)$$

Solving for the force-rebalance signal gives the following equation:

$$\begin{bmatrix} f_{x_s} \\ f_{y_s} \end{bmatrix} = K^{-1} \begin{bmatrix} g_{11} & h_{11} \\ g_{21} & h_{21} \end{bmatrix} \begin{bmatrix} x_s \\ \dot{x}_s \end{bmatrix}, \quad (21)$$

which may be expanded to $$f_{y_s} = \Delta\left(\frac{1}{\tau}\right)\sin(2\varphi - 2\theta_\tau)x_s - \frac{a}{2}\Delta\left(\frac{1}{\tau}\right)\cos(2\varphi - 2\theta_\tau)\dot{x}_s + \quad (22)$$
$$\frac{b}{2}\Delta\left(\frac{1}{\tau}\right)\cos(2\varphi - 2\theta_\tau)\dot{x}_s + \frac{3a}{4}\omega\Delta\omega\cos(2\varphi - 2\theta_\omega)x_s +$$
$$\frac{a}{2}\Delta\left(\frac{1}{\tau}\right)\cos(2\theta_\tau)\dot{x}_s + \frac{b}{2}\Delta\left(\frac{1}{\tau}\right)\cos(2\theta_\tau)\dot{x}_s -$$
$$\frac{1}{\tau(1-ab)}(b\dot{x}_s - a\dot{x}_s + a\cos(2\varphi)\dot{x}_s + b\cos(2\varphi)\dot{x}_s) -$$
$$\omega\Delta\omega\sin(2\varphi - 2\theta_\omega)x_s + \frac{a}{4}\omega\Delta\omega\cos(2\varphi + 2\theta_\omega)x_s -$$
$$\frac{a}{4}\omega\Delta\omega\cos(2\varphi - 2\theta_\omega)x_s +$$
$$\frac{b}{4}\omega\Delta\omega\cos(2\varphi + 2\theta_\omega)x_s - \frac{a}{ab-1}\omega\Delta\omega\cos(2\theta_\omega)x_s.$$

The process then uses the force-rebalance model to identify the set of equations for the bias of the gyroscope (operation 512), with the process terminating thereafter. In operation 512, the following assumption is made:

$$\begin{cases} x_s = c_0\cos(\omega_x t) \\ \dot{x}_s = -c_0\omega_x\sin(\omega_x t), \end{cases} \quad (23)$$

where $c_0$ is the amplitude component in phase with the drive axis, and $\omega_x$ is the natural frequency of the element with respect to the x-axis.

The set of equations identified in operation 512 includes a first equation for an in-phase bias and a second equation for an in-quadrature bias. The in-phase bias may be represented by the following equation:

$$\frac{B}{-c_0\omega_x} = \quad (24)$$
$$\Delta\left(\frac{1}{\tau}\right)\sin(2\varphi - 2\theta_\tau) + \frac{a+b}{2}\Delta\left(\frac{1}{\tau}\right)(\cos(2\theta_\tau) - \cos(2\varphi - 2\theta_\tau)) -$$
$$\frac{b(1+\cos(2\varphi)) - a(1-\cos(2\varphi))}{\tau(1-ab)},$$

where B is the in-phase bias. In equation (24), the in-phase bias, B, is scaled by the term, $c_0\omega_x$. Equation (24) may be further simplified as follows:

$$\frac{B}{-c_0\omega_x} = \quad (25)$$
$$\Delta\left(\frac{1}{\tau}\right)\sin(2\varphi - 2\theta_\tau) + \frac{a+b}{2}\Delta\left(\frac{1}{\tau}\right)(\cos(2\theta_\tau) - \cos(2\varphi - 2\theta_\tau)) -$$
$$\frac{b(1+\cos(2\varphi)) - a(1-\cos(2\varphi))}{\tau(1-ab)}$$

The in-quadrature bias may be represented by the following equation:

$$\frac{quad}{c_0} = -(1+a)\omega\Delta\omega\sin(2\varphi - 2\theta_\omega) + \quad (26)$$
$$\frac{a+b}{4}\omega\Delta\omega\cos(2\varphi + 2\theta_\omega) - \frac{a}{ab-1}\omega\Delta\omega\cos(2\theta_\omega)$$

In this manner, the process illustrated in FIG. 5 provides a method for identifying a set of equations, such as equation (25) and equation (26) for the bias of the gyroscope. The unknown parameters in these equations include a, b, $$\Delta\left(\frac{1}{\tau}\right),$$

$\theta_\tau$, $\Delta\omega$, and $\theta_\omega$. In one illustrative example, these equations may be used in operation 404 in FIG. 4 to identify values for these parameters.

Figure 6:
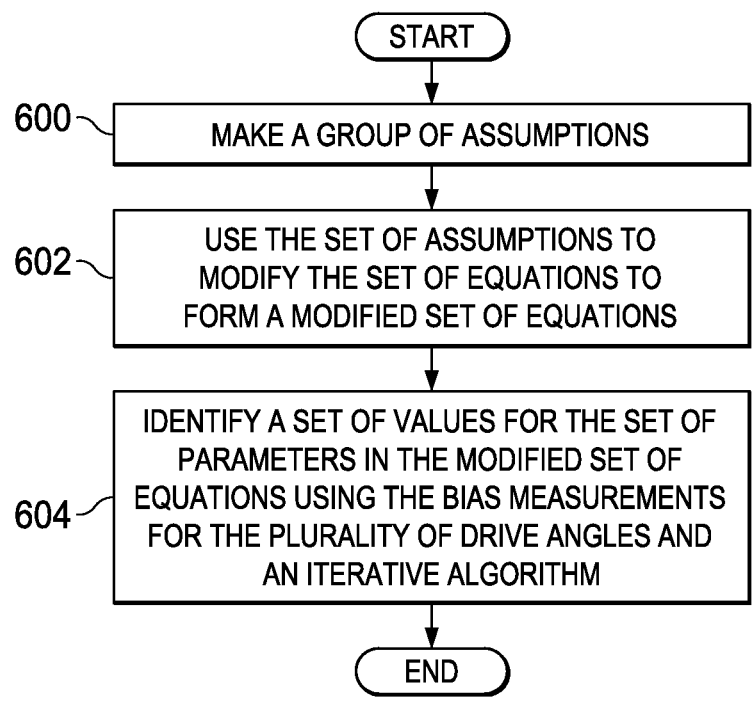
FIG. 6 is an illustration of a process for identifying a set of values for a set of parameters in a set of equations for the bias of a gyroscope in the form of a flowchart in accordance with an illustrative embodiment.

With reference now to FIG. 6, an illustration of a process for identifying a set of values for a set of parameters in a set of equations for the bias of a gyroscope in the form of a flowchart is depicted in accordance with an illustrative embodiment. The process illustrated in FIG. 6 may be an example of one process that may be used to implement operation 404 in FIG. 4.

The process begins by making a group of assumptions (operation 600). In operation 600, the group of assumptions includes assumptions with respect to the in-phase bias of the gyroscope. These assumptions are as follows:

$$\begin{cases} ab \approx 0 \\ \Delta\left(\frac{1}{\tau}\right)a \approx 0 \\ \Delta\left(\frac{1}{\tau}\right)b \approx 0 \\ \cos 2\theta_\tau \approx 1 \\ \sin 2\theta_\tau \approx 2\theta_\tau \\ \Delta\left(\frac{1}{\tau}\right)(2\theta_\tau) \approx 0 \end{cases} \quad (27)$$

Further, the group of assumptions also includes assumptions with respect to the in-quadrature bias of the gyroscope. These assumptions are as follows:

$$\begin{cases} \theta_\omega = 90 + \theta_{\omega 0} \\ \sin 2\theta_\omega = -\sin 2\theta_{\omega 0} \approx -2\theta_{\omega 0} \\ \cos 2\theta_\omega = -\cos 2\theta_{\omega 0} \approx 1 \\ a\Delta\omega \approx 0 \\ b\Delta\omega \approx 0 \\ ab \approx 0 \end{cases} \quad (28)$$

The process then uses the set of assumptions to modify the set of equations to form a modified set of equations (operation

602). The modified set of equations includes a first modified equation for the in-phase bias and a second modified equation for the in-quadrature bias. The first modified equation for the in-phase bias is defined as follows:

$$\frac{B}{-c_0 \omega_x} = \begin{bmatrix} \sin(2\varphi) & \frac{1-\cos(2\varphi)}{\tau} & -\frac{1+\cos(2\varphi)}{\tau} \end{bmatrix} \begin{bmatrix} \Delta\left(\frac{1}{\tau}\right) \\ a \\ b \end{bmatrix} \quad (29)$$

The second modified equation for the in-quadrature bias is defined as follows:

$$\frac{\text{quad}}{c_0} = -\omega\Delta\omega(\sin(2\varphi)\cos(2\theta_{\omega 0}) - \cos(2\varphi)\sin(2\theta_{\omega 0})) \approx -\omega\Delta\omega\sin(2\varphi) \quad (30)$$

The process then identifies a set of values for the set of parameters in the modified set of equations using the bias measurements for the plurality of drive angles and an iterative algorithm (operation 604), with the process terminating thereafter. The bias measurements in operation 604 may be the bias measurements generated by the gyroscope for the plurality of drive angles in operation 400 in FIG. 4.

As one illustrative example, the plurality of drive angles may include angles of about 0 degrees, about 45 degrees, and about 90 degrees with respect to the x-axis. Of course, in other illustrative examples, any angles between about 0 degrees and about 90 degrees with respect to the x-axis may be selected.

For the angles about 0 degrees, about 45 degrees, and about 90 degrees with respect to the x-axis, equation (29) may be rewritten as follows:

$$\frac{1}{-c_0\omega_x} \begin{bmatrix} B(\varphi=0) \\ B(\varphi=45) \\ B(\varphi=90) \end{bmatrix} = \begin{bmatrix} 0 & 0 & -\frac{2}{\tau} \\ 1 & \frac{1}{\tau} & -\frac{1}{\tau} \\ 0 & \frac{2}{\tau} & 0 \end{bmatrix} \begin{bmatrix} \Delta\left(\frac{1}{\tau}\right) \\ a \\ b \end{bmatrix} = C\begin{bmatrix} \Delta\left(\frac{1}{\tau}\right) \\ a \\ b \end{bmatrix} \quad (31)$$

$$\text{with } \det(C) = \frac{4}{\tau^2} \neq 0 \quad (32)$$

The solution for the parameters, a, b, and $$\Delta\left(\frac{1}{\tau}\right),$$

is given by the following:

$$\begin{bmatrix} \Delta\left(\frac{1}{\tau}\right) \\ a \\ b \end{bmatrix} = C^{-1}\left(\frac{1}{-c_0\omega_x}\begin{bmatrix} B(\varphi=0) \\ B(\varphi=45) \\ B(\varphi=90) \end{bmatrix}\right) = \frac{1}{-c_0\omega_x}\begin{bmatrix} -\frac{1}{2} & 1 & -\frac{1}{2} \\ 0 & 0 & \frac{\tau}{2} \\ -\frac{\tau}{2} & 0 & 0 \end{bmatrix}\begin{bmatrix} B_0 \\ B_{45} \\ B_{90} \end{bmatrix} \quad (33)$$

where $B_0$ is the bias measurement for the drive angle of about 0 degrees with respect to the x-axis, $B_{45}$ is the bias measurement for the drive angle of about 45 degrees with respect to the x-axis, and $B_{90}$ is the bias measurement for the drive angle of about 90 degrees with respect to the x-axis.

Further, in operation 604, equation (25) may be rewritten as follows:

$$\frac{\left(\frac{B_{new}}{-c_0\omega_x} + \frac{b(1+\cos(2\varphi)) - a(1-\cos(2\varphi))}{\tau(1-ab)}\right)}{\Delta\left(\frac{1}{\tau}\right)} = \quad (34)$$

$$\sin(2\hat{\varphi} - 2\theta_\tau) + \frac{a+b}{2}(\cos(2\theta_\tau) - \cos(2\hat{\varphi} - 2\theta_\tau))$$

where the damping azimuth angle, $\theta_\tau$, is the only unknown parameter. The iterative algorithm may be used to solve for $\theta_\tau$.

Further, in solving for the parameters in the second modified equation for the in-quadrature bias, equation (30), bias measurements for the angles of about 0 degrees and about 45 degrees with respect to the x-axis may be selected. Consequently, equation (30) may be rewritten as follows:

$$\begin{cases} \frac{\text{quad}(\varphi=45)}{c_0} = -\omega\Delta\omega\cos(2\theta_{\omega 0}) \\ \frac{\text{quad}(\varphi=0)}{c_0} = \omega\Delta\omega\sin(2\theta_{\omega 0}) \end{cases} \quad (35)$$

If the natural frequencies in the drive axis and the sense axis are asymmetrical, $\Delta\omega \neq 0$, then the azimuth angle, $\theta_{\omega 0}$, may be estimated as follows:

$$\hat{\theta}_{\omega 0} = \frac{1}{2}\arctan\left(\frac{q_0}{-q_{45}}\right), \quad (36)$$

where $\hat{\theta}_{\omega 0}$ is the estimated azimuth angle and $q_0$ and $q_{45}$ are the in-quadrature biases at the drive angles of about 0 degrees and about 45 degrees, respectively, with respect to the x-axis. The natural frequency asymmetry for any drive angle may be estimated as follows:

$$\Delta\hat{\omega} = \frac{\text{quad}(\varphi)}{-c_0\omega\sin(2\varphi - 2\hat{\theta}_{\omega 0})}, \quad (37)$$

where $\Delta\hat{\omega}$ is the estimated difference between the natural frequencies for the drive axis and the sense axis.

The set of values identified in operation 604 for the set of parameters in the set of equations for the bias of the gyroscope may be used to estimate the bias of the gyroscope for any drive angle. In particular, the in-phase bias and in-quadrature bias may be estimated for any drive angle.

Further, in these illustrative examples, the estimated azimuth angle, $\hat{\theta}_{\omega 0}$, may be used to identify the particular drive angle identified in operation 406 in FIG. 4. For example, the particular drive angle may be identified as follows:

$$\varphi = 90 + \hat{\theta}_{\omega 0} = 90 + \frac{1}{2}\arctan\left(\frac{q_0}{-q_{45}}\right) \quad (38)$$

The values estimated for a and b may be used to solve the following equation for the drive angle:

$$-(1+a)\sin(2\varphi - 2\theta_\omega) + \frac{a+b}{4}\cos(2\varphi + 2\theta_\omega) - \frac{a}{ab-1}\cos(2\theta_\omega) = 0 \quad (39)$$

Still further, the output of the gyroscope may be calibrated during operation of the gyroscope in operation 408 in FIG. 4 using the following equation:

$$\frac{B}{-c_0\omega_x} = \Delta\left(\frac{1}{\tau}\right)\sin(2\hat{\varphi}) + \frac{a+b}{2}\Delta\left(\frac{1}{\tau}\right)(1-\cos(2\varphi)) - \frac{b(1+\cos(2\hat{\varphi})) - a(1-\cos(2\hat{\varphi}))}{\tau(1-ab)} \quad (40)$$

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 7:
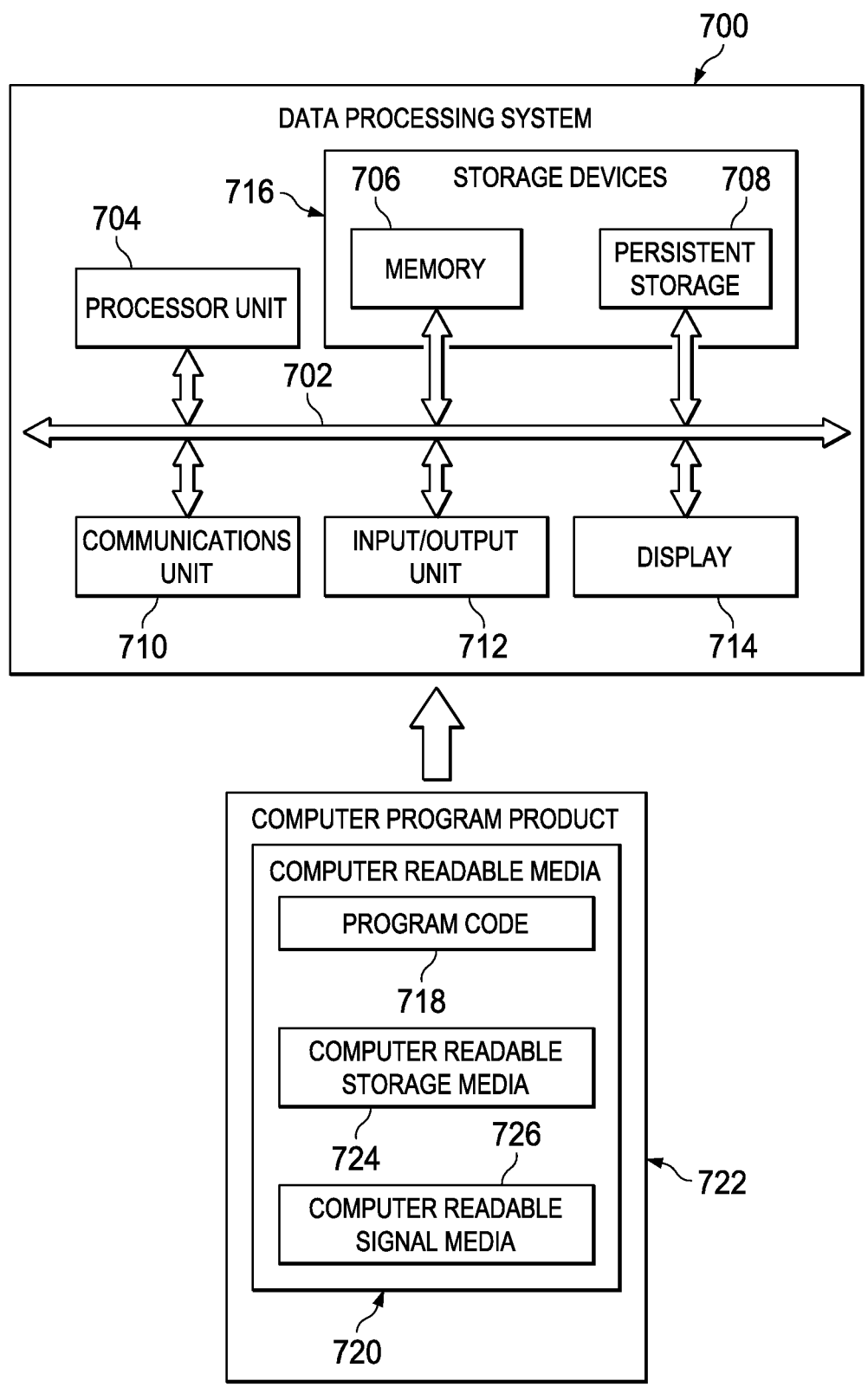
FIG. 7 is an illustration of a data processing system in accordance with an illustrative embodiment.

Turning now to FIG. 7, an illustration of a data processing system is depicted in accordance with an illustrative embodiment. Data processing system 700 may be used to implement computer system 138 in FIG. 1.

In this illustrative example, data processing system 700 includes communications framework 702, which provides communications between processor unit 704, memory 706, persistent storage 708, communications unit 710, input/output (I/O) unit 712, and display 714.

Processor unit 704 serves to execute instructions for software that may be loaded into memory 706. Processor unit 704 may be a number of processors, a multi-processor core, or some other type of processor, depending on the particular implementation. A "number", as used herein with reference to an item, means one or more items. Further, processor unit 704 may be implemented using a number of heterogeneous processor systems in which a main processor is present with secondary processors on a single chip. As another illustrative example, processor unit 704 may be a symmetric multi-processor system containing multiple processors of the same type.

Memory 706 and persistent storage 708 are examples of storage devices 716. A storage device is any piece of hardware that is capable of storing information, such as, for example, without limitation, data, program code in functional form, and other suitable information either on a temporary basis or a permanent basis. Storage devices 716 also may be referred to as computer readable storage devices in these examples. Memory 706, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these examples, provides for communications with other data processing systems or devices. In these examples, communications unit 710 is a network interface card. Communications unit 710 may provide communications through the use of either or both physical and wireless communications links.

Input/output unit 712 allows for input and output of data with other devices that may be connected to data processing system 700. For example, input/output unit 712 may provide a connection for user input through a keyboard, a mouse, and/or some other suitable input device. Further, input/output unit 712 may send output to a printer. Display 714 provides a mechanism to display information to a user.

Instructions for the operating system, applications, and/or programs may be located in storage devices 716, which are in communication with processor unit 704 through communications framework 702. In these illustrative examples, the instructions are in a functional form on persistent storage 708. These instructions may be loaded into memory 706 for execution by processor unit 704. The processes of the different embodiments may be performed by processor unit 704 using computer-implemented instructions, which may be located in a memory, such as memory 706.

These instructions are referred to as program code, computer usable program code, or computer readable program code that may be read and executed by a processor in processor unit 704. The program code in the different embodiments may be embodied on different physical or computer readable storage media, such as memory 706 or persistent storage 708.

Program code 718 is located in a functional form on computer readable media 720 that is selectively removable and may be loaded onto or transferred to data processing system 700 for execution by processor unit 704. Program code 718 and computer readable media 720 form computer program product 722 in these examples. In one example, computer readable media 720 may be computer readable storage media 724 or computer readable signal media 726.

Computer readable storage media 724 may include, for example, an optical or magnetic disk that is inserted or placed into a drive or other device that is part of persistent storage 708 for transfer onto a storage device, such as a hard drive, that is part of persistent storage 708. Computer readable storage media 724 also may take the form of a persistent storage, such as a hard drive, a thumb drive, or a flash memory, that is connected to data processing system 700. In some instances, computer readable storage media 724 may not be removable from data processing system 700.

In these examples, computer readable storage media 724 is a physical or tangible storage device used to store program code 718 rather than a medium that propagates or transmits program code 718. Computer readable storage media 724 also is referred to as a computer readable tangible storage device or a computer readable physical storage device. In other words, computer readable storage media 724 is a media that can be touched by a person.

Alternatively, program code 718 may be transferred to data processing system 700 using computer readable signal media 726. Computer readable signal media 726 may be, for example, a propagated data signal containing program code 718. For example, computer readable signal media 726 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 718 may be downloaded over a network to persistent storage 708 from another device or data processing system through computer readable signal media 726 for use within data processing system 700. For instance, program code stored in a computer readable storage medium in a server data processing system may be downloaded over a network from the server to data processing system 700. The data processing system providing program code 718 may be a server computer, a client computer, or some other device capable of storing and transmitting program code 718.

The different components illustrated for data processing system 700 are not meant to provide physical or architectural limitations to the manner in which different embodiments may be implemented. The different illustrative embodiments may be implemented in a data processing system including components in addition to or in place of those illustrated for data processing system 700. Other components shown in FIG. 7 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 704 may take the form of a hardware unit that has circuits that are manufactured or configured for a particular use. This type of hardware may perform operations without needing program code to be loaded into a memory from a storage device to be configured to perform the operations.

For example, when processor unit 704 takes the form of a hardware unit, processor unit 704 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a field programmable logic array, a field programmable gate array, and other suitable hardware devices. With this type of implementation, program code 718 may be omitted because the processes for the different embodiments are implemented in a hardware unit.

In still another illustrative example, processor unit 704 may be implemented using a combination of processors found in computers and hardware units. Processor unit 704 may have a number of hardware units and a number of processors that are configured to run program code 718. With this depicted example, some of the processes may be implemented in the number of hardware units, while other processes may be implemented in the number of processors.

In another example, a bus system may be used to implement communications framework 702 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, memory 706, or a cache, such as found in an interface and memory controller hub, that may be present in communications framework 702.

Thus, the different illustrative embodiments provide a method and apparatus for electronic bias compensation of a gyroscope. In one illustrative embodiment, a method for electronically compensating for bias of a gyroscope is provided. Bias measurements for a plurality of drive angles are generated using the gyroscope. A set of equations for the bias of the gyroscope is identified using a model for motion of the gyroscope with respect to a non-inertial frame of reference and an assumption that an inertial rate for the gyroscope is substantially zero. The set of equations includes a set of parameters for the bias of the gyroscope. A set of values for the set of parameters is identified using the bias measurements and the set of equations.

Further, a drive angle that reduces the in-quadrature bias of the gyroscope to substantially zero is identified using the set of equations. The gyroscope is operated at the drive angle identified. The bias of the gyroscope at a selected drive angle is estimated using the set of equations with the set of values for the set of parameters to form an estimated bias. The estimated bias is subtracted from a measurement generated by the gyroscope for the selected drive angle to substantially compensate for the bias of the gyroscope.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for compensating measurements of a gyroscope, the method comprising:

operating the gyroscope at a plurality of drive angles to generate measurements of a force rebalance signal, wherein the measurements include a bias;

using a computer system to perform the steps of:
identifying a set of equations for the bias of the gyroscope using a model for motion of the gyroscope in which the set of equations includes a set of parameters for the bias of the gyroscope;
estimating, a set of values for the set of parameters using the measurements, the set of equations, and an iterative algorithm; and
selecting a drive angle in the plurality of drive angles that reduces an in-quadrature bias of the gyroscope to substantially zero using the set of equations;

operating the gyroscope at the selected drive angle;
forming, using the computer system, an estimated bias using the set of equations and the measurements for the selected drive angle; and
subtracting, using the computer system, the estimated bias from the measurements to substantially compensate for the bias of the gyroscope.

2. The method of claim 1, wherein the step of identifying the set of equations for the bias of the gyroscope using the model for the motion of the gyroscope comprises:
identifying the set of equations for the bias of the gyroscope using the model for the motion of the gyroscope and an assumption that an inertial rate for the gyroscope is substantially zero.

3. The method of claim 2, wherein the step of identifying the set of equations for the bias of the gyroscope using the model for the motion of the gyroscope and the assumption that the inertial rate for the gyroscope is substantially zero comprises:
identifying the model for the motion of the gyroscope;
modifying the model for the motion of the gyroscope based on the assumption that the inertial rate for the gyroscope is substantially zero to form a modified model; and
identifying the set of equations for the bias of the gyroscope using the modified model for the motion of the gyroscope.

4. The method of claim 2, wherein the step of identifying the set of equations for the bias of the gyroscope using the model for the motion of the gyroscope and the assumption that the inertial rate for the gyroscope is substantially zero comprises:
identifying a first equation in the set of equations for an in-phase bias of the gyroscope using the model for the motion of the gyroscope and the assumption that the inertial rate for the gyroscope is substantially zero; and
identifying a second equation in the set of equations for the in-quadrature bias of the gyroscope using the model for the motion of the gyroscope and the assumption that the inertial rate for the gyroscope is substantially zero.

5. The method of claim 1 further comprising:
estimating the bias of the gyroscope at a selected drive angle using the set of equations with the set of values for the set of parameters to form the estimated bias.

6. The method of claim 1,
wherein the plurality of drive angles includes angles selected from a range between about 0 degrees and about 360 degrees with respect to a first axis.

7. The method of claim 1, wherein the set of parameters includes at least one of a drive axis misalignment angle, a sense axis misalignment angle, a damping azimuth angle, a damping asymmetry term, a difference between natural frequencies of a drive axis for the gyroscope and a sense axis for the gyroscope, and an azimuth angle of the drive axis with respect to a first axis.

8. The method of claim 1, wherein the gyroscope is a Coriolis vibratory gyroscope.

9. An apparatus comprising:
a gyroscope; and
a compensation system configured to:
receive measurements of a force rebalance signal for a plurality of drive angles from the gyroscope, wherein the measurements include a bias;
identify a set of equations for the bias of the gyroscope using a model for motion of the gyroscope in which the set of equations includes a set of parameters for the bias of the gyroscope;
estimate, a set of values for the set of parameters using the measurements, the set of equations, and an iterative algorithm;
select a drive angle in the plurality of drive angles that reduce an in-quadrature bias of the gyroscope to substantially zero using the set of equations;
operate the gyroscope at the selected drive angle to form an estimated bias using the set of equations and the measurements for the selected drive angle; and
subtract the estimated bias from the measurements to substantially compensate for the bias of the gyroscope.

10. The apparatus of claim 9, wherein in being configured to identify the set of equations for the bias of the gyroscope using the model for the motion of the gyroscope, the compensation system is configured to identify the set of equations for the bias of the gyroscope using the model for the motion of the gyroscope and an assumption that an inertial rate for the gyroscope is substantially zero.

11. The apparatus of claim 10, wherein in being configured to identify the set of equations for the bias of the gyroscope using the model for the motion of the gyroscope and the assumption that the inertial rate for the gyroscope is substantially zero, the compensation system is configured to:
identify the model for the motion of the gyroscope;
modify the model for the motion of the gyroscope based on the assumption that the inertial rate for the gyroscope is substantially zero to form a modified model; and
identify the set of equations for the bias of the gyroscope using the modified model for the motion of the gyroscope.

12. The apparatus of claim 10, wherein in being configured to identify the set of equations for the bias of the gyroscope using the model for the motion of the gyroscope and the assumption that the inertial rate for the gyroscope is substantially zero, the compensation system is configured to:
identify a first equation in the set of equations for an in-phase bias of the gyroscope using the model for the motion of the gyroscope and the assumption that the inertial rate for the gyroscope is substantially zero; and
identify a second equation in the set of equations for the in-quadrature bias of the gyroscope using the model for the motion of the gyroscope and the assumption that the inertial rate for the gyroscope is substantially zero.

13. The apparatus of claim 9, wherein the compensation system is further configured to estimate the bias of the gyroscope at a selected drive angle using the set of equations with the set of values for the set of parameters to form the estimated bias.

14. The apparatus of claim 9, wherein the plurality of drive angles includes angles selected from a range between about 0 degrees and about 360 degrees with respect to a first axis.

* * * * *